(12) United States Patent
Little et al.

(10) Patent No.: US 8,116,602 B2
(45) Date of Patent: Feb. 14, 2012

(54) HIGH EFFICIENCY OPTICAL MODE TRANSFORMER FOR MATCHING A SINGLE MODE FIBER TO A HIGH INDEX CONTRAST PLANAR WAVEGUIDE

(75) Inventors: Brent E. Little, Columbia, MD (US); Saitak Chu, Columbia, MD (US)

(73) Assignee: Infinera Corporation, Sunnyvale, CA (US)

( * ) Notice: Subject to any disclaimer, the term of this patent is extended or adjusted under 35 U.S.C. 154(b) by 1795 days.

(21) Appl. No.: 10/473,946

(22) PCT Filed: Apr. 2, 2002

(86) PCT No.: PCT/US02/10416
§ 371 (c)(1),
(2), (4) Date: Oct. 2, 2003

(87) PCT Pub. No.: WO03/044580
PCT Pub. Date: May 30, 2003

(65) Prior Publication Data
US 2010/0266288 A1    Oct. 21, 2010

Related U.S. Application Data

(60) Provisional application No. 60/280,935, filed on Apr. 3, 2001.

(51) Int. Cl.
*G02B 6/26* (2006.01)
*H04B 10/00* (2006.01)
(52) U.S. Cl. .......... 385/27; 385/31; 385/43; 385/14; 385/129; 385/130; 385/131; 398/139
(58) Field of Classification Search ............ 385/14, 385/25, 26, 27, 28, 30, 49, 43, 129, 130, 385/131, 132, 141; 398/139
See application file for complete search history.

(56) References Cited

U.S. PATENT DOCUMENTS

| | | | |
|---|---|---|---|
| 5,703,895 A | 12/1997 | Ghirardi et al. | 372/50 |
| 6,108,478 A | 8/2000 | Harpin et al. | 385/129 |
| 6,229,947 B1 | 5/2001 | Vawter et al. | 385/132 |

(Continued)

OTHER PUBLICATIONS

International Preliminary Examination Report International Search Report dated Mar. 26, 2004, in PCT /US2002/010416.

(Continued)

*Primary Examiner* — Brian Healy
(74) *Attorney, Agent, or Firm* — Ross Carothers; David L. Soltz (57) ABSTRACT

The present invention includes a device and a method for fabricating a device that is an optical power mode transformer that accepts light in a mode transformation direction where the transformer is attached to or embedded in a semiconductor microchip and includes a first single or multimode optical input (SM) waveguide including a first core surrounded by a cladding, and, a second high contrast index grade (HC) waveguide including a second core having a tapered region and surrounded by said cladding, a portion of the tapered region of the core being embedded within the first optical input waveguide region with an embedded length sufficient for efficient light transfer from the first input waveguide to the said second waveguide wherein the embedded portion of the tapered region is fully surrounded by the first input waveguide along an axial and radial cross-section of the second waveguide in the mode transformation direction. In this manner, it is possible that the long (SM) waveguide eventually actually acts as a cladding for the (HC) waveguide.

23 Claims, 10 Drawing Sheets

U.S. PATENT DOCUMENTS

| | | | |
|---|---|---|---|
| 6,631,225 B2 * | 10/2003 | Lee et al. | 385/28 |
| 6,697,551 B2 * | 2/2004 | Lee et al. | 385/28 |
| 6,870,987 B2 * | 3/2005 | Lee | 385/28 |
| 7,218,809 B2 * | 5/2007 | Zhou et al. | 385/28 |
| 7,359,593 B2 * | 4/2008 | Little | 385/30 |
| 2002/0031296 A1 * | 3/2002 | Lee et al. | 385/28 |
| 2003/0044118 A1 * | 3/2003 | Zhou et al. | 385/43 |
| 2004/0037497 A1 * | 2/2004 | Lee | 385/28 |
| 2010/0266288 A1 * | 10/2010 | Little et al. | 398/139 |

OTHER PUBLICATIONS

International Search Report dated May 5, 2003, in PCT /US2002/010416.

* cited by examiner

HIGH EFFICIENCY OPTICAL MODE TRANSFORMER FOR MATCHING A SINGLE MODE FIBER TO A HIGH INDEX CONTRAST PLANAR WAVEGUIDE

CLAIM TO PRIORITY

Applicants hereby claim priority under all rights to which they are entitled under 35 U.S.C. Section 119 based upon the Provisional Application Ser. No. 60/280,935 for this Patent Cooperation Treaty (PCT) patent application (USPTO receiving office) filed at the United States Patent and Trademark Office on Apr. 3, 2001.

FIELD OF INVENTION

This invention relates to the transferal of optical power from a single mode (SM) optical fiber into a much smaller, high-index contrast (HC) waveguide. HC waveguides are desirable for making ultra-compact optical circuits on a semiconductor or dielectric microchip. These waveguides consist of cross-sectional dimensions that are much smaller than conventional SM fibers. Directly connecting a SM fiber to a HC waveguide is quite impractical, as the result would be poor or insufficient optical power transfer. This optical power transfer is more commonly described as coupling efficiency. To efficiently couple two waveguides with very different cross-sectional dimensions resulting in different "spot sizes" (which refer to the size of the spot illuminated by light transmitted through the waveguide onto a non-illuminated area), some sort of mode transformer is required. The mode transformer of the present invention essentially acts as a funnel for capturing, focusing, and transmitting the optical signal without significant power loss by "necking down" from a wide area spot to a small area spot. Robust realization of such transformers has not been easily achieved nor has it been straight forward for planar fabrication technology.

BACKGROUND OF UM INVENTION

1. Field of the Invention

The invention relates to the field of semiconductor and dielectric optical components used for optical transmission or optical digital data processing. It pertains especially to all optical components comprising active and/or passive waveguides and also to single and multimode fibers, for example components such as semiconductor lasers, semiconductor amplifiers, modulators, and wavelength filters, to name a few. There is a great deal of ongoing research and development effort to reduce the cost of optical modules while maintaining the minimum loss of optical power. A major component of the fabrication costs usually arises from the joining of such components to optical fiber, as for example when it is necessary to couple optical modes of very different sizes. Thus, when a laser and a flat-end single-mode optical fiber are joined together, the optical mode of the laser or a high-index contrast (HC) guide spot size with a diameter of, for example 1-2 um, has to be coupled with the optical mode of a single mode (SM) optical fiber whose diameter is far greater, for example in the range of 5-10 um.

To enable the coupling of these optical modes of very different sizes, spot-size converters or mode transformers are made in order to increase the size of the mode at the output of the optical component and make its profile compatible with that of the mode guided in the optical fiber. The reverse can also be accomplished to decrease the size of the mode from a single mode (SM) fiber to a high-index contrast (HC) waveguide. However, this mode matching must be done while preserving the performance characteristics of the component.

Figure 1:
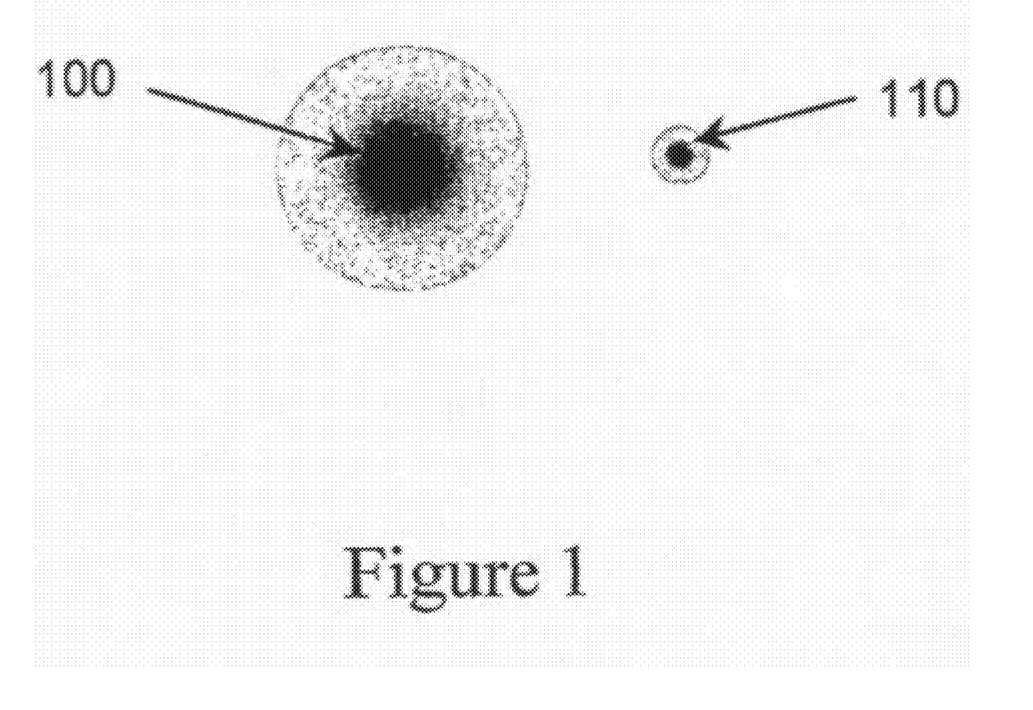
FIG. 1 is a diagram comparing the spot size of a single mode (SM) optical fiber with a high index (HC) grade waveguide spot size.

For instance, in connecting a SM fiber having a mode spot size of 8 μm, to a HC waveguide having a spot size of 1.5 μm, over 90% of the power is lost. Such loss is intolerable in optical communication systems. FIG. 1 shows the relative sizes of the modes (field patterns) of a conventional SM fiber (100), and that of a HC waveguide. (110). The SM fiber spot size is typically 5-10 μm which is as much as an order of magnitude greater than that of an HC waveguide—typically 1-2 μm.

When transforming the modes between two waveguides with different refractive index and/or core sizes, high coupling loss arises due to the difference in mode size, shape, and mode velocity. For example, the index difference and the mode size of a fiber optic waveguide are different than those of a high index difference planar waveguide, resulting in high coupling loss when the fiber optic waveguide and the high index difference planar waveguide are directly coupled.

A channel waveguide is a dielectric waveguide whose core is surrounded by a cladding that is comprised of materials with refractive indices lower than that of the core, and wherein the peak optical intensity resides in the core. Waveguides in general can be defined by other geometries as well. A high index contrast (HC) waveguide is defined as one where the core cladding index contrast is larger than that of a typical single mode fiber (that is, larger than approximately 1%). HC waveguides also typically have mode field diameters that are smaller than that of a single mode fiber by a factor of two.

Figure 2:
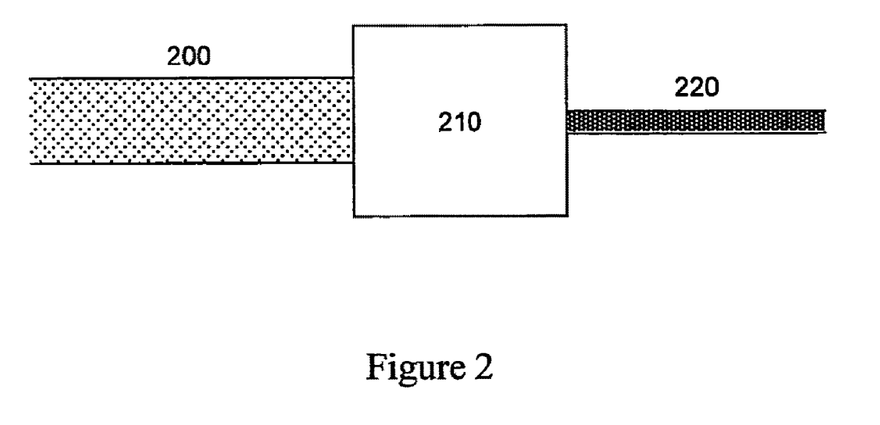
FIG. 2 is a diagram illustrating the functional purpose of a mode transformer used in transition between the tandem of a single mode optical fiber and a high index grade waveguide.

In optical components, it is essential to have low coupling loss when attaching a fiber to a microchip. To efficiently couple two waveguides with very different dimensions and therefore two different spot sizes, some sort of mode transformer is required. As shown in FIG. 2, the mode transformer essentially acts as a funnel, necking down a wide area spot from the SM fiber (200) to a small area spot associated with the HC waveguide (220). FIG. 2 depicts the functionality of such a mode transformer (210)

A mode transformer between two different waveguides is an essential part of an optical
system where the lightwave (mode) from one optical component is coupled into another component. In optical communication, a mode transformer between an optical fiber waveguide and a high index difference (difference in the refractive indices of core and cladding) planar waveguide is crucial for successful implementation of planar lightwave circuits (PLC) in fiber communication. Therefore, developing an efficient mode transformer between two waveguides has continued to be a subject of intense research.

In addition, the core index of the fiber optic waveguide is lower than that of the high index difference planar waveguide causing a mode velocity difference between two waveguides. As will be detailed in the Detailed Description section, when such a change in mode properties takes place too quickly, high power loss arises.

2. Prior Art

There have been several other approaches to achieve efficient mode coupling between two waveguides with different index difference, including mode transformation by tapering the dimension of high index difference waveguides. Mode transformation by a taper has been shown in various publications. Over the tapering region of the high index difference waveguide, the thickness or width of the waveguide core is gradually tapered down from that of the normal guiding region to a lower thickness or width. As the mode travels from the normal guiding region of the high index difference waveguide into the tapering region, the mode experiences decreasing amount of the core material. The fraction of the mode field distribution that exists outside the core material increases, changing the mode size. The index of the waveguide that the mode experiences is effectively changed by the presence of the taper. In other words, the "effective index" is gradually changed by the taper. By gradually changing the effective index from that of the low index waveguide to that of the high index difference waveguide, the mode coupling can be achieved between two waveguides without high loss. The method to determine the effective index is described in "The Handbook of Photonics", Boca Raton, Fla. CRC Press, 532-535 (1996) by M. Gupta.

T. Brenner et. al. ("Integrated optical modeshape adapters in InGaAsP/InP for efficient fiber-to-waveguide coupling," IEEE Photonics Tech. Lett. Vol. 5, No. 9, 1993) show a mode transformer using a vertically tapered high contrast waveguide. Vertical tapering uses special etching techniques that are not well controlled and therefore difficult to manufacture. Also the vertical taper shape cannot be arbitrarily specified, but is more a function of etching characteristics, rather than design. The mode size propagating in the tapered region increases due to the reduction of the effective index, and thus the reduction of the effective index difference. The publication indicates the gradual mode transformation occurring in one waveguide due to the presence of a taper.

U.S. Pat. No. 5,199,092, issued to Stegmueller et al. shows the coupling of modes between two different waveguides: one broad and one narrow. The two waveguides run parallel to one another and are superimposed with each other to provide a superimposing waveguide guidance. During the superimposed waveguide guidance, one of the two waveguides is tapered down in vertical dimension, while the other waveguide dimension is kept constant. The role of the tapered waveguide is to provide a gradual effective index change, and thus mode transformation, in the same manner as the cases cited in journal publications including that by Brenner et al. The difference is the superimposition of the narrow waveguide, providing waveguiding in the broad waveguide once the narrow waveguide is completely terminated by the vertical taper. The broad waveguide is surrounding the narrow waveguide over the whole waveguiding distance. The presence of the broad waveguide helps guiding the mode once the mode transformation is complete.

In addition to single taper devices described above, dual tapers are used in mode transformation between two different waveguides. IEEE Photonic Technology Letters, Vol. 7, No. 5, May 1995 by Zengerle et al., reports a mode transformer having two channel waveguides, each with a taper, one sitting on top of the other. Electronics Letters, Vol. 29, No. 4, February 1993 by Schwander et al., reports a mode transformer having two rib waveguides, each with a taper, a portion of one embedded within the other. Both of the rib waveguides used in the art are weakly guiding. This is not a suitable method for mode transformation to or from a high index difference waveguide.

Y. Shani et. al. ("Efficient coupling of a semiconductor laser to an optical fiber by means of a tapered waveguide on silicon", Appl. Phys. Lett. vol. 55, No. 23, 1989.) describe a mode transformer using a taper embedded within a second larger waveguide. Their taper is however adiabatic. In that case the taper was wedge shaped (linearly tapered) and very long in order to make use of the adiabatic mechanism. The taper is required to also come down to a sharp point, which makes it almost impossible to perform in a lithographic process.

B. M. A. Rahman et. al. ("Improved laser-fiber coupling by using spot-size transformer", IEEE Photonics Technology Lett. Vol. 8, No. 4, 1996) describe a mode transformer using two synchronously coupled waveguides, where one guide is a smaller high contrast guide and the other has a spot size approximating the size of a fiber mode. Their mode transformer does not use any mode evolution process, and the coupling is not terminated, causing coupling to periodically transfer between the two guides indefinitely.

G. A. Vawter et. al. ("Tapered rib adiabatic following fiber couplers in etched GaAs materials for monolithic spot-size transformation," IEEE J. Selected Topics Quantum Electronics, Vol. 3, No. 6, 1997) show an adiabatic coupler from one waveguide to another where the high contrast waveguide is on top of the larger fiber-matched waveguide.

Variations of the above types of mode transformers can also be found in several review articles, including that by I. Moerman et. al. (A review of fabrication technologies for the monolithic integration of tapers with III-V semiconductor devices, "IEEE J. of Selected Topics Quantum Electronics," Vo. 3, No. 6, 1997) which summarizes primarily dual type waveguide tapering.

In U.S. Pat. No. 6,253,009 entitled "SEMICONDUCTOR OPTICAL COMPONENT COMPRISING A SPOT-SIZE CONVERTER", the invention relates more particularly to a semiconductor optical component, comprising an active waveguide and a passive waveguide that are superimposed and buried in a sheathing layer, wherein the component comprises successively: a damped coupling section in which the width of the active waveguide tapers down and the width of the passive waveguide increases, and a mode expansion section comprising only the passive waveguide whose width tapers down. According to another characteristic of the invention, the component furthermore comprises a transition section positioned between the damped coupling section and the mode expansion section, in which the width of the active waveguide tapers down to 0 um. The invention enables the making of an optical component comprising an integrated spot-size converter, wherein the optical mode is chiefly deconfined in the passive guide so much so that the current threshold and the efficiency of the component are not affected. The passive and active waveguides are not aligned but they are coupled vertically, so much so that the problems related to alignment are prevented. Furthermore, the two types of active and passive waveguide may be optimized separately.

In U.S. Pat. No. 6,130,969 entitled "HIGH EFFICIENCY CHANNEL DROP FILTER" a highly efficient channel drop filter employs a coupling element including a resonator-system between two waveguides, which contains at least two resonant modes. The resonator-system includes one or more interacting resonant cavities which in addition to being coupled to the waveguides, can also be coupled directly among themselves and indirectly among themselves via the waveguides. Each component of the coupling element can be configured or adjusted individually. The geometry and/or dielectric constant/refractive index of the resonator-system are configured so that the frequencies and decay rates of the resonant modes are made to be substantially the same. The filter can achieve 100% signal transfer between the waveguides at certain frequencies, while completely prohibiting signal transfer at other frequencies. In the invention shown, the filter is configured with photonic crystals. In accordance with alternative embodiments of the invention, there are provided channel drop filter devices with flat-top and straight-sidewall lineshape characteristics. These lineshape characteristics are realized by using several resonance to couple the waveguides, and by designing the relative position with respect to one another.

In U.S. Pat. No. 5,682,401 entitled "RESONANT MICROCATIVIES EMPLOYING ONE-DIMENSIONALLY PERIODIC DIELECTRIC WAVEGUIDES" the invention provides a resonant microcavity which includes a periodic waveguide, and a local defect in the periodic dielectric waveguide which accommodates spacial confinement of radiation generated within the waveguide around the defect. The inventive concept also provides a method of enhancing radiation confinement within a resonant microcavity and minimizing radiation losses into an associated substrate, the microcavity configured within a periodic confinement, the method including the step of increasing the refractive index contrast between the microcavity and the substrate.

In U.S. Pat. No. 5,229,883 entitled "HYBRID BINARY OPTICS COLLIMATION FILL OPTICS" the invention relates generally to means for collimating, aberration correcting, and angularly aligning the output of a diode laser array, a more particularly to a combination of a cylindrical lens and a pair of binary optical elements which are optimized to collimate, aberration correct, and align the individual diodes or a diode laser array such that each individual diode fills its aperture. Here, a cylindrical lens and a binary optical element for collimating with low optical aberrations provides an asymmetrically diverging input wavefront. The binary optical element is formed on a planar substrate on which a binary optical diffraction pattern is etched on the front surface thereof. The binary optical diffraction pattern is designed such that each ray of light from the diverging input light source will travel the same optical path length or vary from that optical path length by an integer multiple of the wavelength of the light traveling from its source to its exit from the front surface of the binary optical element. A beam angle alignment element is also provided, to be utilized in conjunction with a cylindrical lens and the binary optical element, for correcting angular misalignments of diode lasers whose output wavefront has an optical axis which is either above or below the plane in which the active region is formed. The beam angle alignment element is also a planar substrate on which a binary optic diffraction pattern is etched. The binary optic diffraction pattern of the beam angle alignment elements diffracts the wavefront exiting from the binary optic element so as to align the wavefront about its optical axis. The cylindrical lens, the binary optical element, as well as the beam angle alignment element may be used in conjunction with a single diode lasing element, as well as a one dimensional or a two dimensional laser array.

In U.S. Pat. No. 6,198,860 entitled "OPTICAL WAVEGUIDE CROSSINGS", the invention relates to the field of optical waveguide crossings. In constructing integrated optical circuits, space constraints and the desire to operate on multiple input waveguides often necessitate waveguide crossings. It is crucial that the crossings be as efficient as possible. A typical application is optical switching, where a large number of inputs are directed to as many outputs, and crossing is necessary in order for each input to connect to every output. Simplicity of fabrication on small length scales means that the waveguides must actually intersect, and cannot simply pass over one another. Any additional three-dimensional structure adds considerable manufacturing difficulty.

the invention includes an optical waveguide structure, a first waveguide, a second waveguide that intersects with the first waveguide, and a photonic crystal resonator system at the intersection of the first and second waveguides. In accordance with another embodiment there is provided an optical waveguide crossing structure including a first waveguide that propagates signals in a first direction, a second waveguide that intersects with the first waveguide and propagates signals in a second direction, and a photonic crystal crossing region at the intersection of the first and second waveguides that prevents crosstalk between the signals of the first and second waveguides. In accordance with another embodiment of the invention there is provided an optical waveguide structure including a first waveguide, a second waveguide, and a resonator system at the intersection of the first and second waveguides, the intersection possessing a first minor plane that is parallel to the first waveguide, the resonator system supporting a first resonant mode that includes different symmetry with guided modes in the first waveguide with respect to the first mirror plane, the resonator system substantially reduces crosstalk from the second waveguide to said first wave.

Additional approaches have been envisaged to the deconfining of the optical mode of a component. Another method known as butt coupling that enables the coupling of a passive waveguide with an active waveguide is very common today. This method consists, in a first stage, in achieving the growth, on a substrate, of a first layer constituting the active waveguide formed for example by a quaternary material and in burying this layer in a sheathing layer constituted, for example by InP. These two layers are then etched locally according to a standard etching method on a zone reserved for the integration of a passive type of waveguide. An epitaxial regrowth operation is performed to make this passive waveguide. For this purpose, a layer of quaternary material capable of acting as the passive waveguide, is deposited on the substrate in the zone that is locally etched beforehand. Then it is buried in a sheathing layer made of an InP for example. The structure of the active waveguide is different from that of the passive waveguide. The coupling interface between the two types of waveguides is called a butt joint. Furthermore, to enable the deconfining of the optical mode, the thickness of the passive guide tapers evenly all along the passive section.

This method of manufacture is fully mastered at the present time. However, it requires an additional step of etching and epitaxially regrowth, thus giving rise to an increase in the cost price of the component. Furthermore, for aligning the active and passive guides, the alignment tolerance values remain low. Although the technique of butt coupling is well mastered, it remains a difficult and extremely important step. This method is relatively complex to implement and entails costs that are still high.

One other method known as the method of selective epitaxial growth, has been considered. In this method, the composition of a waveguide is made to vary continuously, to make it gradually go from an active waveguide state to a passive waveguide state. The selective growth of the material constituting the waveguide is achieved on a substrate by the use of two dielectric masks, made of silica (SiO2) or silicon nitride (Si3N4) for example, placed side by side. The species under the growth do not get deposited on these masks, and a phenomenon of diffusion of species under growth is created. The shape of the masks is determined so that the phenomenon of diffusion of the species is pronounced to a greater or to a lesser extent, depending on the regions of the waveguide that are considered. Just as in the butt coupling method, the thickness of the waveguide in the passive section tapers down in order to permit the deconfinement of the optical mode, therefore the increasing of its size. The optical guide is furthermore buried in a sheathing layer.

This method has the advantage of comprising only one epitaxial step. However, it cannot be used to optimize the two waveguides, namely the active waveguide and the passive waveguide, separately. This means that it necessitates compromises. Furthermore, this method does not enable a clear definition of the boundary between the two types of guides, active and passive, because the change in state is gradual. The fact of not being able to define this boundary causes penalties because it is difficult to know where to position the electrode necessary for the operation of the component. This electrode must indeed be positioned above the active guide to ensure efficient operation of the component. By contrast, if it covers a part of the passive guide, electrical leaks are created that penalize and degrade the threshold current, efficiency current and efficiency parameters.

None of the prior art provides for an efficient mode transformation between a low index difference and a high index difference waveguide on a microchip. This invention discloses, for the first time, an efficient optical mode transformer based on a taper design, useful for transforming the mode to a high index difference waveguide on a semi-conductor microchip. The matching of the optical mode according to the invention is performed chiefly in the HC waveguide that is embedded on the semiconductor microchip.

BRIEF DESCRIPTION OF THE DRAWINGS

FIGS. 4 (a)-(d) illustrates cross sectional slices along four separate locations of the mode transformer beginning at the input guide.

FIGS. 6(a) and (b) are schematic cross-sectional and top-down, respectively, of schematic views of a mode transformer with specific material and optical parameters.

FIGS. 7 (a)-(d) show the optical field in the mode transformer of various slices of planes with numeric labels corresponding to the dashed lines in FIGS. 6 (a) and (b).

DETAILED DESCRIPTION OF THE INVENTION

The following description will further help to explain the inventive features of the High Efficiency Optical Mode Transformer for Matching a Single Mode Fiber with a High-Index Contrast Planar Waveguide on a microchip.

The approach used in this invention is to separate the problem into two steps with definitive objectives. The first objective is to get optical power from the SM fiber onto the chip (but not into the HC guide) with the highest possible efficiency. Once high efficiency connectivity and optical power transmission is established onto the chip, power is then transferred into the HC waveguide via an on chip mode transformer.

A large planar waveguide is fabricated on the chip for the purpose of obtaining maximum coupling efficiency from a fiber to a specific structure on the chip. The dimensions of the large waveguide are chosen so as to achieve maximum coupling efficiency. This waveguide is referred to as a fiber-matched waveguide. An optical mode transformer on the chip then converts the optical power in the fiber-matched waveguide into the HC waveguide.

For the present invention, the onchip fiber-matched waveguide has a fundamental mode with a spot size matching that of a SM fiber. This fiber-matched waveguide can be single mode (SM) or multimode (MM) with an index of refraction that is arbitrary. However, the fiber-matched waveguide core index of refraction ($n_i$) must be lower than the index of refraction of the HC waveguide ($n_{HC}$), such that $n_i < n_{HC}$. When such a change in mode properties takes place too quickly, high power losses arise. In the present invention this problem is overcome.

In the present invention the long waveguide eventually may act as a cladding for the HC waveguide.

Figure 3:
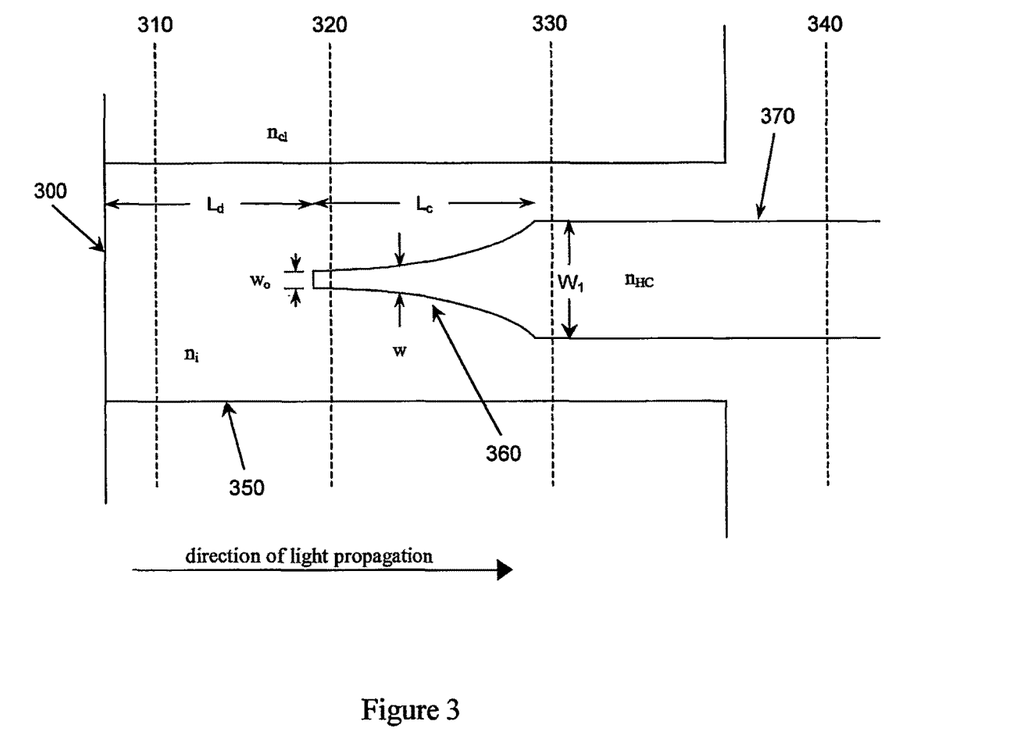
FIG. 3 is a schematic illustration of a top-down view of the waveguide arrangement in the mode transformer.

FIG. 3 is a top-down schematic view of the waveguide arrangement in the mode transformer. Referring to FIG. 3, the mode transformer has a first waveguide referred to as the "Input waveguide" (350) where light is propagated in from, for example an optical fiber, through a microchip facet (300) along a leading distance ($L_d$) from (310) to (320). The dimensions of the Input waveguide (350) are selected so as to support a fundamental waveguide mode that has the same shape and size as the external fiber or waveguide that is to be connected to the microchip substrate. FIG. 4A shows the cross section of the input guide, at the location (310) marked by a dash line in FIG. 3. There is some cross-sectional distance between the chip facet and the start of the mode transformer High Contrast (HC) waveguide ($L_d$). This distance is arbitrary, but usually made large enough to accommodate the variation in chip dicing accuracy (so that the dicing does not cut into the HC guide). The refractive index of the core of the Input waveguide (350) is designated as $n_i$. The index surrounding the core can be arbitrary, but must be lower than $n_i$, which is the usual condition for waveguiding. This material which surrounds the core is called the cladding, and its value can be a function of position. For instance, the cladding index on top of the core might be different than the index that the core rests upon (which may be the microchip substrate). The cladding index is designated by the symbol $n_{cl}$. The dimensions of the input waveguide (350) are chosen in such a way that the fundamental mode of the input waveguide (350) matches the fundamental mode of the external fiber/waveguide to be attached. This ensures high coupling efficiency from the external fiber to the chip, and is the first step in eventually achieving high coupling efficiency to the HC waveguide (370).

There is a second waveguide core imbedded in the Input waveguide (350) core. This waveguide is the High Contrast (HC) waveguide (370). This is the waveguide that comprises the optical circuitry on the chip. This second waveguide (370) has a core index of $n_{HC}$, which must be larger than the index of the Input waveguide (350). That is $n_{HC} > n_i$. The dimensions of the HC guide (370) are necessarily smaller than those of the Input waveguide (350). Typically the dimensions are selected to keep the HC waveguide (370) single mode. This single mode requirement does not apply to the Input waveguide (350).

As the light propagates further toward the HC guide (370) into a second portion of the mode transformer (320), it is desired to have substantially all of the optical signal in the Input waveguide (350) coupled into the smaller HC waveguide (370). To this end, the HC waveguide has a taper transition region that extends from (320) to (330) in FIG. 3. The details of the taper shape determine the coupling efficiency. At the very start of the taper, the width has some value $w_o$. At the end of the taper, the width is $w_1$, with $w_1 > w_o$. $w_1$ may or may not be the waveguide width used throughout the rest of the optical circuit. The length of the taper, extending between the input width $w_o$ and the end width $w_1$, is designated as $L_c$. The value of the width is varied throughout the taper region, and is designated generally as w. The value of the width w controls the optical power coupling strength between the Input waveguide (350) and the HC guide (370).

Figure 4:
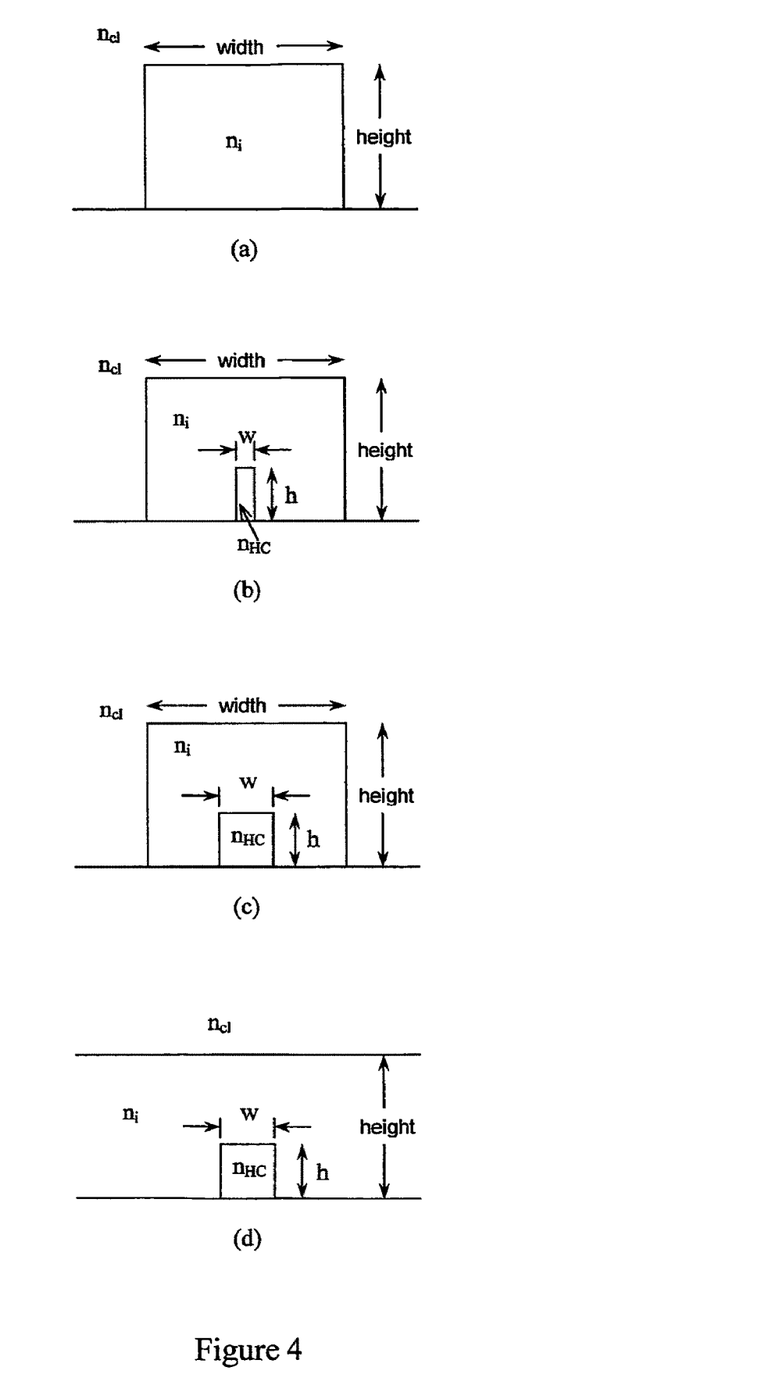

The Input waveguide (350) supports an optical mode that has an effective index of $N_{ei}$ (The effective mode index can be calculated by numerous methods, see for example, Dietrich Marcuse "Theory of Dielectric Optical Waveguides, $2^{nd}$ ed." Academic Press, 1991). The HC waveguide (370) supports a mode that has an effective index of $N_{eHC}$, and which is a function of width w. The input taper width $w_o$ is chosen so that the HC waveguide is near its cutoff condition (320). (The cutoff condition is point where the waveguide no longer supports a guided mode, see Dietrich Marcuse "Theory of Dielectric Optical Waveguides, $2^{nd}$ ed." Academic Press, 1991). When this condition for $w_o$ holds, then as the waveguide width is slowly increased from $w_o$, optical power tends to flow into the HC waveguide (370). FIG. 4 (b) shows the cross section along the dotted line marked (320) in FIG. 3. This cross section is near the start of the taper. Optical power flow in the direction from the Input guide (350). to the HC guide (350) is favored because of two coupling mechanisms. The first mechanism is mode evolution. In this case, the optical power tends to follow the physical path that has the largest local effective index. As the HC guide width is increased, the effective index in the HC region (330) to (340) increases relative to the effective index of the Input waveguide (350). In this manner, optical power then tends to flow into the HC waveguide (370). This is similar to conventional optical focusing or light refraction. The second method is synchronous coupling, also referred to as phase-matched coupling. Synchronous coupling is the coupling between two guided modes that have nearly identical effective indexes (phase-matched coupling between two guides is described in detail in Dietrich Marcuse "Theory of Dielectric Optical Waveguides, $2^{nd}$ ed." Academic Press, 1991). In the present scenario, when the HC waveguide is near cutoff (320), its effective index is nearly that of the material surrounding the core of the HC waveguide. This surrounding material is in fact the core material for the Input waveguide, and its effective index is substantially similar to its core material index (because the Input waveguide is not close to its own cutoff). Hence, near the cutoff of the HC guide, the effective indexes of the HC guide (370) and the Input guide (350) are close enough for synchronous coupling to occur. In addition, because the HC guide is imbedded in the Input waveguide, the coupling is said to be strong. Both coupling mechanisms are present in this mode transformer, and are responsible for the short length of the transformer, and the transformer's broadband and polarization insensitive behavior. This mode transformer works over a broad range of optical communications wavelengths, including the c-band (1520 nm to 1570 nm).

The width of the taper (from $w_0$ to $w_1$) is slowly increased along the direction of propagation for most of the taper length. The taper length $L_c$ is chosen long enough to allow complete power transfer between Input guide (350) and HC guide (370). Near the end of the taper, near (330), the HC core width is expanded more rapidly. This is to ensure that power which couples from the Input guide (350) to the HC guide (370) does not couple back into the Input waveguide (350). Increasing the HC guide width beyond a certain width effectively terminates both the mode evolution coupling and the synchronous coupling. Taper shapes that approximate the ideal type of slow variation followed by rapid expansion of the core width, and which are smoothly varying, are polynomials whose order is in the range of 2 to 8. FIG. 4 (c) shows the cross section along the dashed line marked (330) in FIG. 3. This cross section is also representative and synonymous with of the steady state width of the HC guide (370).

Once all of the optical power is transformed into the HC guide (370), the Input guide (350) can be terminated (340). In FIG. 3, the Input guide is terminated by expanding its boundaries out indefinitely, effectively turning it into a slab waveguide. FIG. 4 (d) shows the cross section along the dashed line marked (340) in FIG. 3. The Input waveguide material with index $n_i$ now becomes the conventional cladding material for the HC guide.

Figure 5:
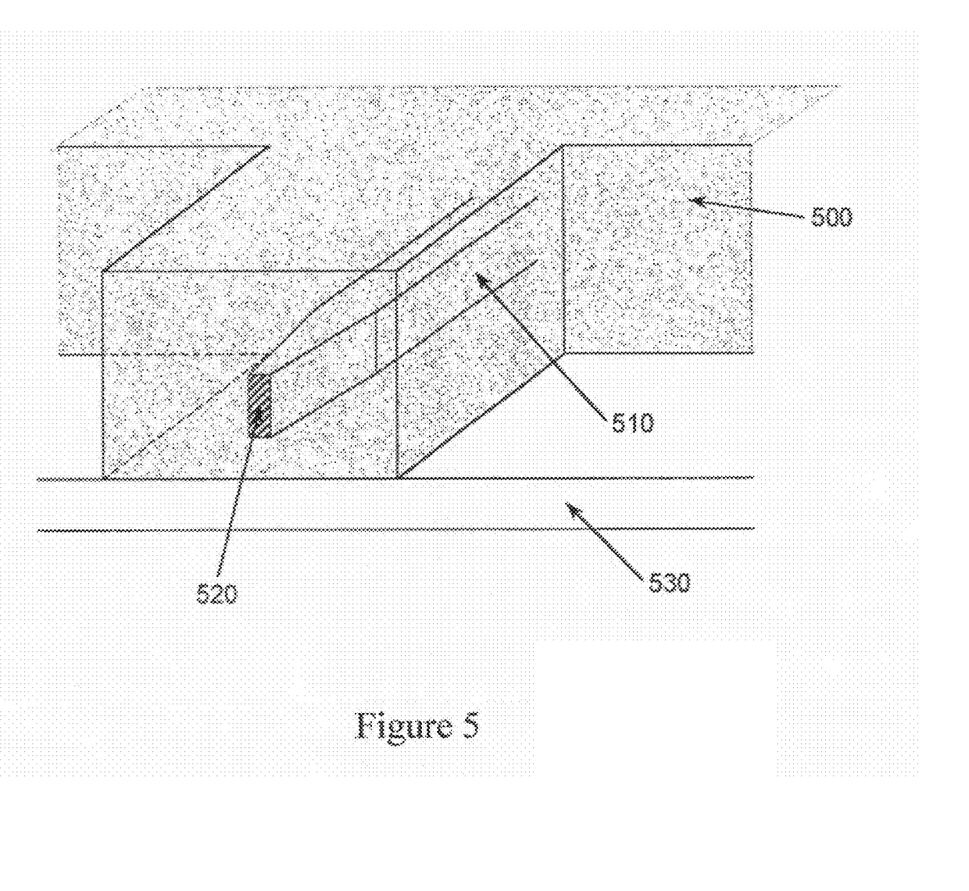
FIG. 5 is a perspective view that combines the schematic illustration of FIG. 3 with the cross-sectional slices of FIGS. 4(a)-(d).

FIG. 5 is a perspective view of the optical mode transformer as shown schematically in FIGS. 3 and 4. In FIG. 5, the surrounding material (500) is in fact the core material for the Input waveguide (510), and its effective index is substantially similar to its core material index (because the Input waveguide is not close to its own cutoff). At the incoming optical power end where light is propagated in from (500) is a cross-sectional tapered open end with width $w_0$ where tapered expansion of the Input waveguide begins. The transformer is shown as placed on an $SiO_2$ on silicon substrate (530) of a microchip.

Figure 6:
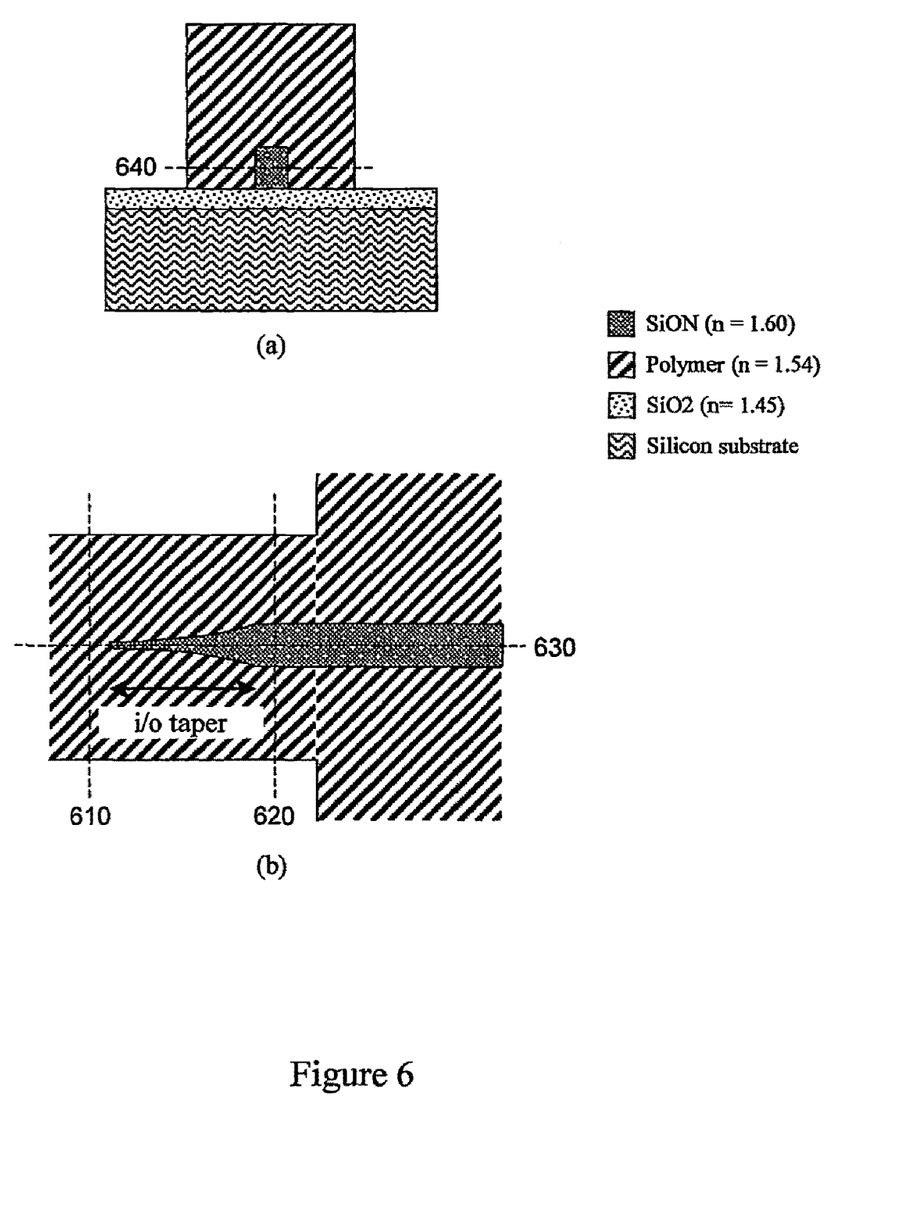
Figure 7:
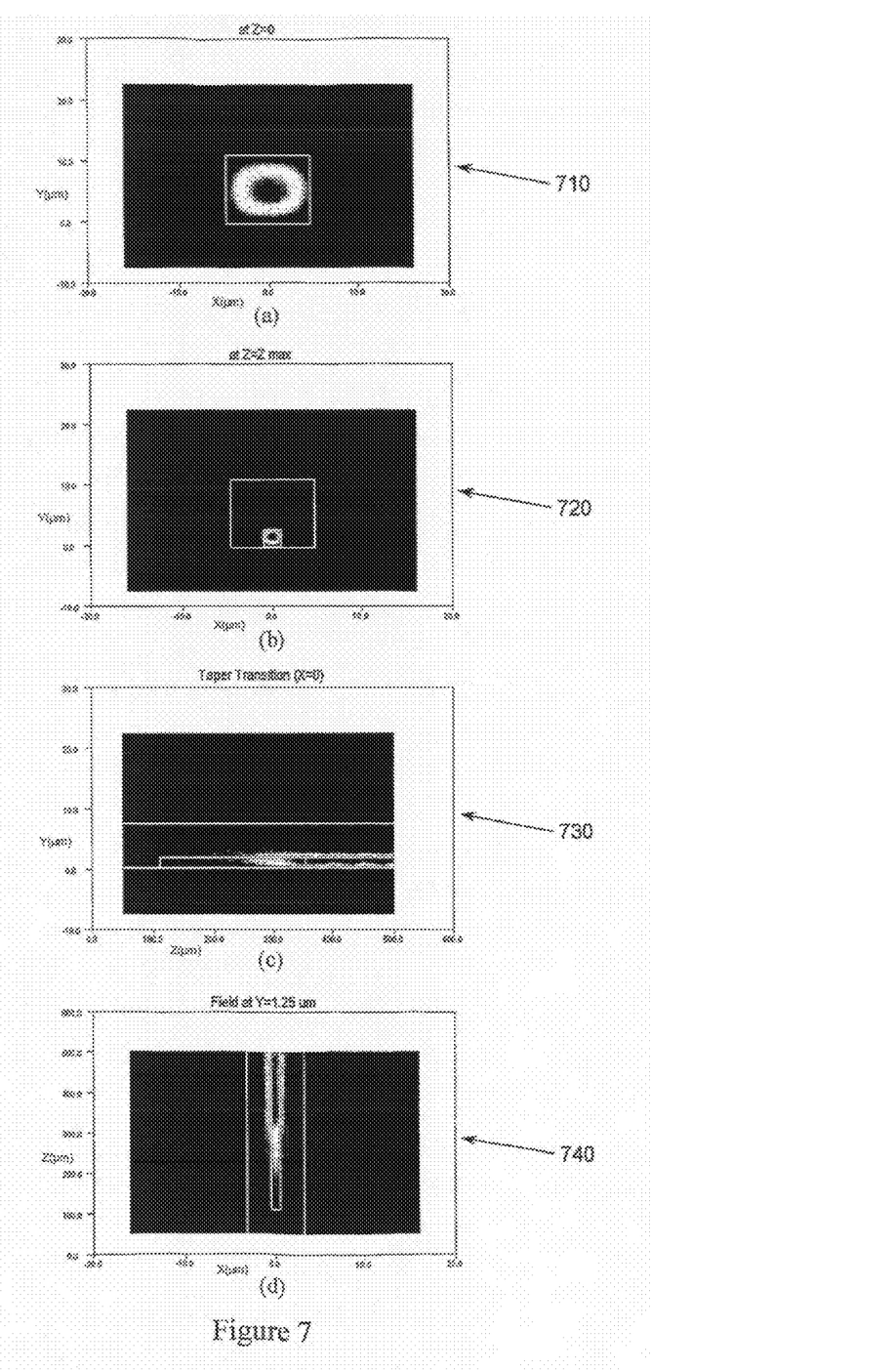

FIGS. 6 and 7 are directly from experimental simulations of a mode transformer with specific parameters. The simulations were carried out using commercially available rigorous numerical simulation tools (In this case the simulation tool was the Prometheus Beam Propagation Method Package, available from Kymata Software Inc. Enschede, The Netherlands—now part of Alcatel). FIG. 6 is a schematic diagram that shows the crossectional and top-down views. FIG. 6 (a) at line (610) corresponds with FIG. 7 (a)—(710), that illustrates the actual experimental results where the input optical fields from the fiber matched mode are transformed, in a lens-like focusing fashion. For FIG. 6 (b) the cross-section slices or cuts along planes shown by dashed lines (620), (630), and (640) correspond to FIGS. 7(b) to 7(d)—(720), (730), and (740) that are actual experimental microphotographs which indicate the optical field in various slices or cuts along the planes shown in FIG. 6. FIGS. 7a and 7b and corresponding micrographs (710) and (720) are the mode field patterns of the fiber-matched mode Input mode, and the HC mode, respectively. FIGS. 7c and 7d and corresponding micrographs (730) and (740) show how the input fields from the fiber matched mode are transformed and focused in a lens-like fashion, into the HC modes.

Figure 8:
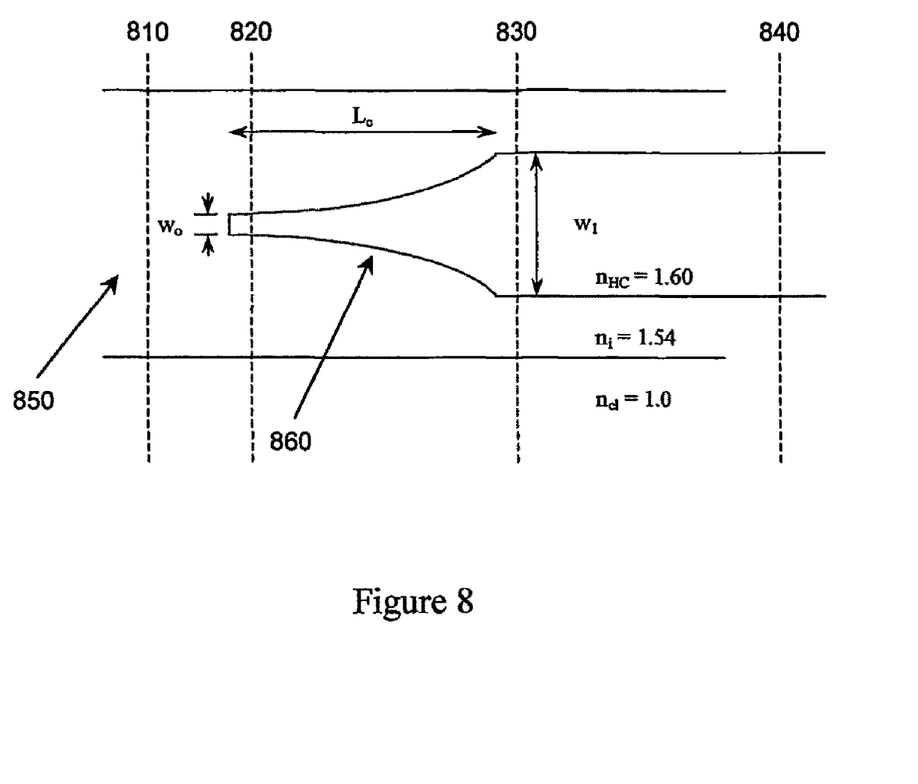
FIG. 8 shows the top down view of a specific taper of an optical mode transformer used in the present invention.
Figure 10:
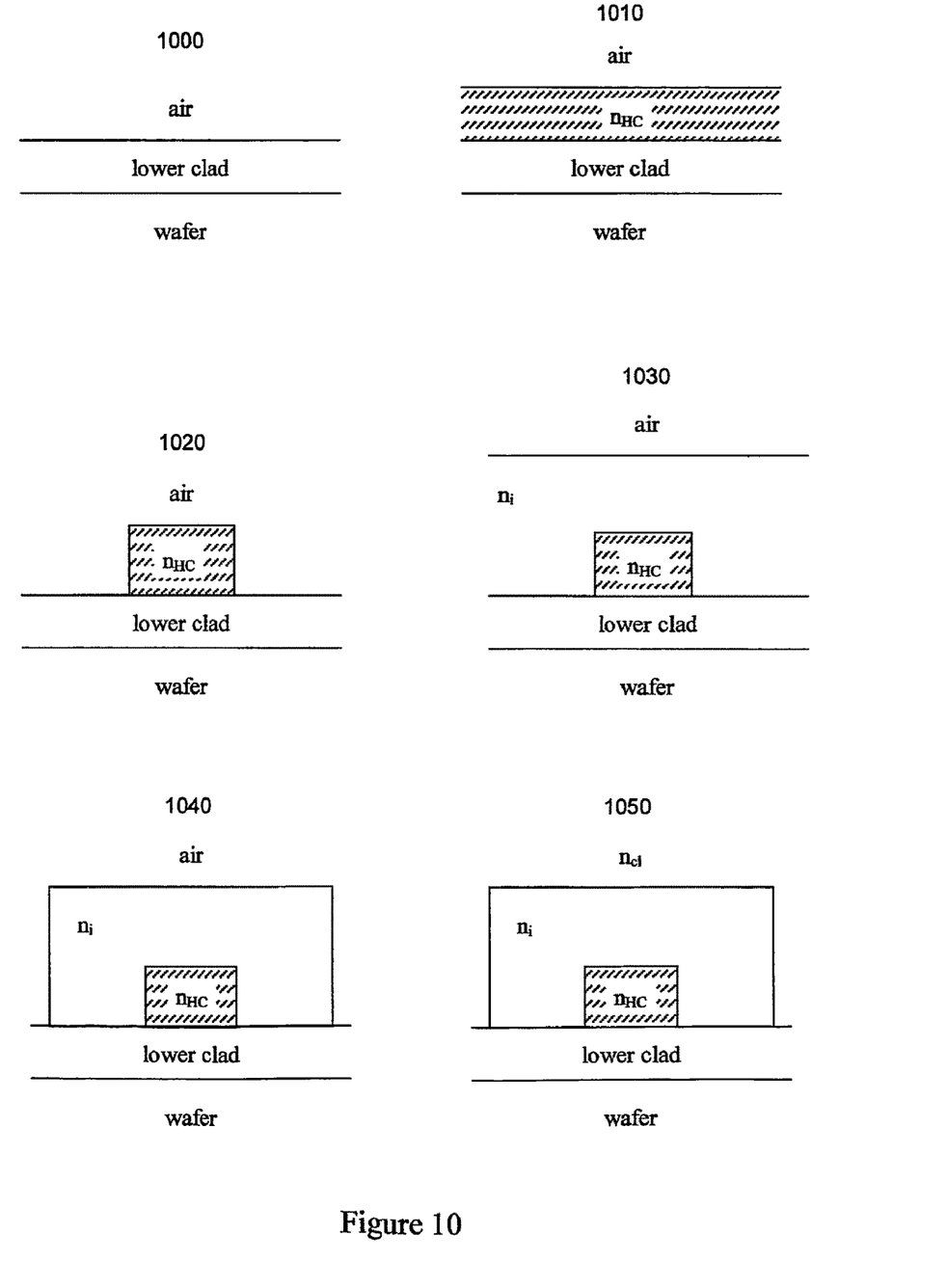
FIG. 10 is a schematic representation of the fabrication steps required for fabrication of an optical mode transformer with an onchip HC waveguide that has a fundamental mode with a spot size matching that of a SM fiber.

FIG. 8 is a schematic diagram of the top down view of specific taper that was used in an experimental realization of the present invention. Here, the specific slices or cuts of the planes (810), (820), (830), and (840) correspond directly to FIG. 3 sections (310), (320), (330), and (340). In the experiment, the taper has a variable "tip width", and a also variable taper shape, while the other parameters are indicated on the figure as the input guide (850) and the taper portion (860). The taper takes on a specific polynomial shape between its fixed tip ($w_o$) and steady state waveguide widths ($w_1$) that were varied during experimentation to optimize the optical mode transformer charactyeristics by minimzing any power losses. Here, $w_1$=2 um, $L_c$=300 um, and the indices of refraction were $n_{HC}$=1.60, $n_i$=1.54, and $n_{cl}$=1.00, respectively. Fabrication steps of the actual optical mode transformer device is shown in FIG. 10.

Figure 9:
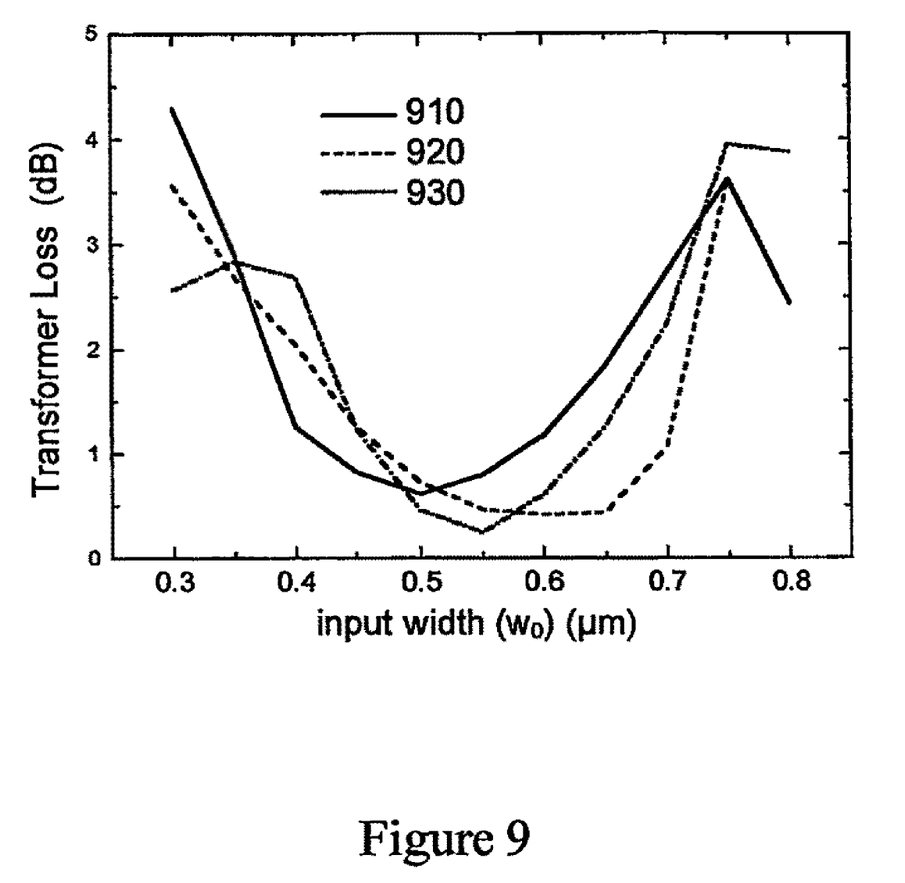
FIG. 9 is a plot of the experimental results of an actual optical mode transformer of the present invention illustrating optical loss of the mode transformer as a function of tip width for various taper shapes.

FIG. 9 is a summary plot of the experimental results of the realized structure of the present invention. The plot shows the optical loss of the mode transformer as a function of tip width $w_o$, for various taper shapes (910), (920), and (930). The shapes are the shape of the taper width w as a function of propagation distance from the input to the fixed output width. The shapes follow simple polynomials of powers 4, 5, and 6. In this case (910) refers to a polynomial of the $4^{th}$ order, (920) refers to a polynomial of the $5^{th}$ order and (930) refers to a polynomial of the $6^{th}$ order. This experiment, and the index values used in the experimental design achieved and schematically represented in FIG. 8, correspond to an optical wavelength of 1.55 μm. For this experimental result, lowest loss, and thus optimal function was achieved using a $6^{th}$ order polynomial shape with an input tip width of approximately 0.55 μm.

Fabrication Steps

The following semiconductor microchip fabrication steps are well known in the art, and are very similar to those used in the microelectronics and integrated optics fabrication industry. This example shows the specific steps of one often used sequence, but there are many other methods. (See for example, Hiroshi Nishihara, Masamitsu Haruna, Toshiaki, Suhara, "Optic integrated circuits" McGraw-Hill, 1985). FIG. 10 illustrates these steps as described below.

A substrate wafer is chosen as a carrier on which various dielectric layers will be deposited or grown. Common substrates include silicon, quartz, and indium phosphide. Often, a lower cladding material is deposited or grown on the substrate for the purpose of acting as a lower cladding or buffer to shield the optical mode from the substrate. A typical buffer layer on silicon is silicon dioxide as used in the present invention. The first step in FIG. 10, (1000) shows a cross section of a wafer with a lower clad.

The core layers of the High Contrast (HC) waveguide is deposited as a thin film. Common deposition techniques include chemical vapor deposition (CVD), sputtering, epitaxial growth, and spin on glasses or polymers. Common materials that form the core are doped silica, silicon, silicon nitride, silicon oxynitride, compound glasses, spin on glass, optical polymers, and quaternary compounds such as aluminum-gallium-arsenide-phosphide. The amount of material deposited is determined by design requirements, and is well controlled in the deposition steps. The second step in FIG. 10, (1010) shows a cross section of a wafer with a thin film layer of core material used for the HC waveguide. In the present invention, the silicon oxynitride with n=1.60 was utilized.

Photoresist (with an n=1.54 in the experimental portion of the present invention) is spun onto the wafer, and the optical circuit layout is photographically patterned into the photoresist. The pattern comes from a design mask that is used as a photographic plate. The design includes the taper sections. The photoresist pattern is transferred into the HC layer by standard etching techniques that uses the photoresist as a mask. Etching techniques including chemical wet etching or reactive ion etching. After pattern transfer, the remaining photoresist is striped away, leaving a ridge or strip of HC core material that forms the core of the HC optical circuit. The third step in FIG. 10, (1020) shows a cross section of the wafer after the HC thin film layer has been etched, and the photoresist has been striped off.

Material for the core of the Input waveguide is deposited by similar methods to the deposition of the HC layer. The result is a thin film of Input guide core material over the entire wafer and over the HC strips. Because the HC strips have a certain non-zero height, there may be some topography over the ridge area. That is, the top surface of the material just deposited might not be planar over the entire wafer. This might be inconsequential. However, if a flat surface is desired, the surface can be planarized by well known techniques such as polishing. The amount of material deposited is determined by the design, and typically the design objective for this layer is to match the mode dimensions of the external fiber. The fourth step in FIG. 10, (1030), shows a cross section of the wafer after material to the Input waveguide is deposited over the entire wafer.

Similar to step 3, photoresist is spun onto the wafer, and the Input waveguide is photographically patterned. The pattern is transferred to the Input waveguide material by etching the material. The photoresist is striped away, and the result is ridges that are now the Input Waveguide, and buried within the input waveguides are the HC guides. The fifth step in FIG. 10, (1040), shows a cross section of the wafer after material for the Input waveguide has been etched, and the photoresist has been striped.

Finally, cladding material is deposited over the entire wafer. In the final or sixth step in FIG. 10, (1050), it is shown that for a cross section of the wafer, a top cladding layer has been deposited over the entire wafer.

In this manner, for the present invention, the onchip HC waveguide can be fabricated to assure that it has a fundamental mode with a spot size matching that of a SM fiber. This fiber waveguide can be single mode (SM) or multimode (MM) with an index of refraction that is arbitrary. In the present invention the long waveguide may act as a cladding for the HC waveguide in the final step.

As will be appreciated by those skilled in the art, the present invention and methods of fabrication are not limited to those detailed above.

What is claimed is:

1. An optical power mode transformer comprising:
a first waveguide including a first core and a first portion of a cladding, the first waveguide being configured to receive a plurality of optical signals, each of the plurality of optical signals having a corresponding one of a plurality of wavelengths, the plurality of wavelengths being in a C-band, such that a minimum one of the plurality of wavelengths is substantially equal to 1520 nm and a maximum one of the plurality of wavelengths is substantially equal to 1570 nm, the first waveguide having a first refractive index contrast; and
a second waveguide including a second core having a tapered region and a second refractive index contrast greater than the first refractive index contrast, the second waveguide including a second portion of the cladding, the first and second waveguides being configured such that the plurality of optical signals propagates from the first waveguide to the second waveguide in a propagation direction, the tapered region widens in the propagation direction and a portion of the tapered region is provided on a portion of the first core.

2. The transformer of claim 1, wherein at least two coupling mechanisms are present in said transformer, said first coupling mechanism being a mode evolution mechanism whereby a first optical power follows a physical path; and said second mechanism being a synchronous coupling mechanism whereby second optical power is transferred between two guided modes that have nearly identical effective indexes.

3. The transformer of claim 2, wherein said at least two coupling mechanisms terminate at a location along the second waveguide.

4. The transformer of claim 1, wherein said a width of the tapered region varies with a length of the transformer in accordance with a higher order polynomial in a range of 2 to 8.

5. The transformer of claim 4, wherein the higher order polynomial is in a range of between 4 and 6.

6. The transformer of claim 1, wherein a narrowest portion of the tapered region is greater than 0.3 microns.

7. The transformer of claim 1, wherein the plurality of optical signals is a first plurality of optical signals and the plurality of wavelengths is a first plurality of wavelengths, the first and second waveguides also being configured such that a second plurality of optical signals, each of which having a corresponding one of a second plurality of wavelengths in an L-band propagates from the first waveguide to the second waveguide.

8. The transformer of claim 1, wherein the first and second cores have different refractive indices and the cladding comprises one or more materials having a refractive index that is different than the refractive indices of the first and second cores.

9. The transformer of claim 1, wherein the index of refraction of said first core is graded in an axial and radial direction of the first core.

10. The transformer of claim 1, wherein the index of refraction of said second core is graded along said axial and radial direction of the second core.

11. The transformer of claim 1, wherein the index of refraction of said cladding is graded along said radial and axial direction of the cladding.

12. The transformer of claim 1, wherein an index of refraction associated with the transformer changes from said first core to said cladding in the axial and radial directions of the cladding.

13. The transformer of claim 1, wherein an index of refraction associated with the transformer changes from said second core to said cladding in the axial and radial directions of the cladding.

14. The transformer of claim 1, wherein an index of refraction associated with the transformer changes from said first core to said cladding in the axial and radial direction at a location in the tapered region.

15. The transformer of claim 1, wherein an index of refraction associated with the transformer changes between said second core and said cladding.

16. The transformer of claim 1, wherein an index of refraction of said first core is higher than an index of refraction of said cladding.

17. The transformer of claim 1, wherein a propagating optical mode is transformed in size, shape, and speed as the propagating optical mode propagates from the first core to the second core.

18. The transformer of claim 1, wherein a propagating optical mode in the transformer propagates bi-directionally in the first and second waveguides.

19. The transformer of claim 1, wherein the tapered region provides an effective index change to a propagating optical mode in the transformer.

20. The transformer of claim 1, wherein the tapered region focuses a propagating mode into said second core.

21. A transformer according to claim 1, wherein the transformer has a damped coupling section, a length of the damped coupling section is less than or equal to 300 microns.

22. A transformer according to claim 1, wherein the transformer has a mode expansion section, a length the mode expansion section is in a range of 75 to 500 microns.

23. A transformer according to claim 1, wherein the tapered region includes a mode expansion section, a width of the said second waveguide in the mode expansion section increases from a value of 0.5 to 1.0 microns in the propagation direction.

* * * * *